Figure 1:
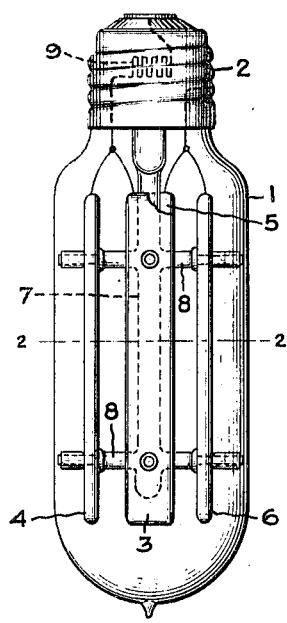

D. McF. MOORE.
GASEOUS CONDUCTION LAMP.
APPLICATION FILED NOV. 30, 1917.

1,316,967.

Patented Sept. 23, 1919.

Inventor:
Daniel McFarlan Moore,
by Albert G. Davis
His Attorney.

UNITED STATES PATENT OFFICE.

DANIEL McFARLAN MOORE, OF EAST ORANGE, NEW JERSEY, ASSIGNOR TO GENERAL ELECTRIC COMPANY, A CORPORATION OF NEW YORK.

GASEOUS-CONDUCTION LAMP.

1,316,967.   Specification of Letters Patent.   Patented Sept. 23, 1919.

Application filed November 30, 1917. Serial No. 204,553.

*To all whom it may concern:*

Be it known that I, DANIEL McFARLAN MOORE, a citizen of the United States, residing at East Orange, in the county of Essex, State of New Jersey, have invented certain new and useful Improvements in Gaseous-Conduction Lamps, of which the following is a specification.

My invention relates to gaseous conduction devices in which more or less rarefied vapors or gases contained in a closed vessel are rendered luminous by an electric discharge in the space between electrodes mounted in the vessel, and more particularly to devices of this character to be used as a source of light.

In vacuum tube or gaseous conduction devices of the character to which my invention relates the electric current passing through the tube does not form an arc, but produces a glow discharge. In a tube, such as the well-known Geissler tube, containing a gas at a low pressure, the glow discharge produced by the passage of an electric current through the tube does not extend uniformly throughout the tube. Near the cathode is a non-luminous region known as the first dark space or Crookes's space; beyond this is a luminous region known as the negative glow, followed by the second dark space, or Faraday's space, between which and the anode is a luminous region known as the positive glow.

In the gaseous conduction lamps heretofore known the negative glow forms a negligible part of the light giving column and the positive glow is the source of light. In most of these gaseous conduction lamps a difference of potential of several thousand volts must be maintained between the electrodes of the tube in order to obtain sufficient light to be useful, and in all of them a potential of that order of magnitude is necessary to start the discharge. Even when the drop of potential at the cathode is reduced by using alkali metals, such as sodium or potassium, for the cathode, the tube will not start until a potential of the order of thousands of volts is applied to it, although it will run at a potential somewhat lower than the starting potential after it is once started. Electrodes of the alkali metals are objectionable because such metals become either plastic or molten when the tube is in operation and consequently very special constructions are necessary to maintain the cathode in place or else the tube must be constructed and handled as though it had liquid electrodes. The customary method of developing the high potential for starting is to provide some kind of an auxiliary device such as an interrupter, a transformer, or some similar inductive device which will, at least momentarily, impress upon the tube a potential high enough to start it. The starting devices increase the cost and add complications to the lamp.

The principal object of my invention is to provide a gaseous conduction lamp which has stationary electrodes, preferably of solid metal, and which will start and operate when connected directly to a low potential lighting circuit such as a 110 volt or a 220 volt circuit, without the interposition or use of any auxiliary means for raising the potential above that of the line. Another object is to provide a gaseous conduction lamp which is of substantially the same dimensions and as rugged as an incandescent lamp and which, when connected directly to either an alternating or direct lighting circuit of the usual potential, will light up at the potential of the circuit, so that it may be put directly in the lamp sockets in place of the ordinary incandescent lamps with no change in the wiring and will occupy about the same space as the ordinary incandescent lamp does. A further object is to improve gaseous conduction lamps in general as more fully pointed out hereinafter.

To these ends I construct a gaseous conduction lamp with a rare gas of high conductivity, such as neon, and properly related electrodes, the pressure of the gas and the spacing of the electrodes being such that substantially the only luminous discharge in the lamp is the negative glow and the first dark space near the cathode is negligibly small. The spacing of the electrodes, by which I mean potentials of 300 volts or less, is so chosen that a low potential will start and maintain the discharge, so that when the lamp is put in a socket connected to an ordinary lighting circuit of a potential of 220 volts, for example, it immediately lights up like an ordinary incandescent lamp. The elimination of interrupters, special inductive circuits and the high potentials heretofore necessary is of great importance and advantage. My invention also comprises the various novel features and details of construction which are more fully hereinafter described and pointed out with particularity in the appended claims.

Figure 3:
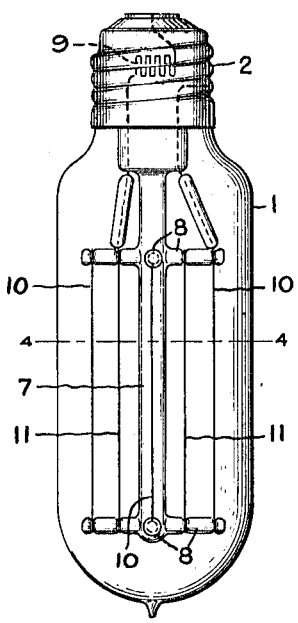
Figure 5:
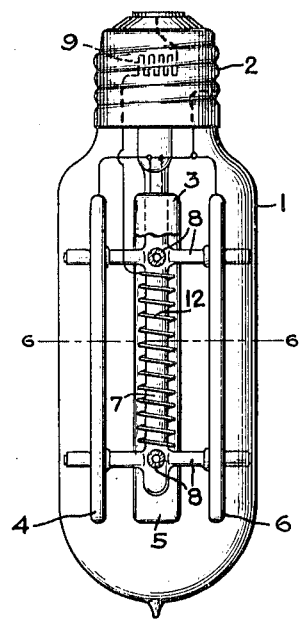
Figure 2:
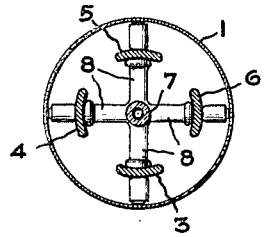
Figure 4:
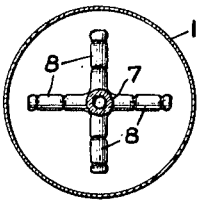
Figure 6:
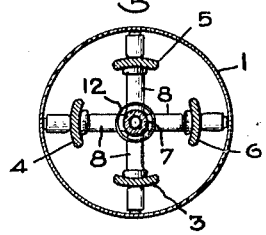
Figure 7:
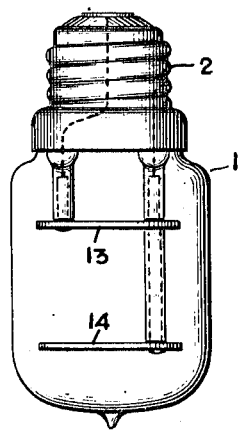

My invention will best be understood in connection with the accompanying drawings in which merely for purposes of illustration I have shown some of the various forms in which my invention may be embodied and in which Figure 1 is a side view and Fig. 2 is a cross-section of same on line 2—2 of one form of lamp; Fig. 3 is a side view of a lamp having filamentary electrodes, and Fig. 4 is a cross-section of same on line 4—4; Fig. 5 is a side view of another form of lamp and Fig. 6 is a cross-section of same on line 6—6. Fig. 7 is a side view of another form of lamp having the electrodes in the form of disks.

The particular form of gaseous conduction lamp shown in Fig. 1 comprises a sealed glass bulb 1 of substantially the size commonly used for the larger sizes of incandescent lamps and provided with a standard base 2 so the lamp can be put in an ordinary incandescent lamp socket. The bulb 1 is preferably cylindrical but can be made in other forms if desired. A number of electrodes, such as 3, 4, 5 and 6, made of some suitable metal such as aluminum, are mounted in the bulb about a common center. The electrodes may be connected so that the alternate electrodes are of opposite polarity, 3 and 5, for example, being connected to one terminal, and 4 and 6 to the other, or 3 and 4 may be connected to be at the same polarity and 5 and 6 to be at the opposite polarity.

I prefer to make the electrodes long and narrow and to mount them side by side in such a relation to one another that the distance from the edge of one electrode to the adjacent is very considerably less than the length of the electrodes. A desirable form of support for holding the electrodes stationary in proper relation is that illustrated in Figs. 1 and 2 in which a glass hub 7 rigidly secured to the bulb at one end is provided with radial arms 8 on which the electrodes are mounted. The arms 8 are preferably made of some insulating material such as glass and a convenient method of mounting the electrodes on them is to provide the electrodes with holes through which the arms 8 extend.

The atmosphere in the bulb 1 preferably consists of some of the rare gases of high conductivity such as neon or helium or a mixture of the two. On account of its high conductivity and luminosity, as compared with the other gases, I prefer neon in as pure a condition as it is possible to obtain it. The pressure of the gas in the bulb 1 is so much less than that of the atmosphere that the luminous discharge which occurs from the electrodes is for all practical purposes the negative glow only, the positive column being either entirely or substantially absent, but nevertheless the pressure is high enough to make the first dark space, or Crookes's space, next to the cathode so small as to be inconsequential. The absolute pressure necessary to obtain the desired result depends upon the composition and purity of the gas and upon the character and spacing of the electrodes. When the proper pressure is attained and the lamp is connected to a suitable source of direct current, the glow discharge appears as a bright corona about the negative electrode, but practically no luminosity is observed in the immediate vicinity of the positive electrode.

In some cases, where the atmosphere contains deleterious gases or the electrodes contain impurities, a dark deposit may gradually appear on the arms 8. To guard against short circuiting due to the presence of this dark deposit I may place within the base 2 of the lamp a small resistance 9 preferably of several hundred ohms and connected in series with the lamp.

When a lamp constructed in accordance with my invention is connected directly to a circuit of low potential, such as the 220 volt circuits commonly used for lighting, the lamp will light up instantly without the application of a higher potential and will continue to give light without any attention or adjustments of any kind. The internal structure is practically as simple and as rugged as that of an incandescent lamp, and since no starting device or high potential of any kind is required, the lamp can be inserted in any ordinary lamp socket in place of the ordinary incandescent lamp.

As a concrete example of a lamp embodying my invention and suitable for use on circuits of 220 volts, I have obtained good results and comparatively long life with a lamp constructed as in Fig. 1, the bulb 1 being about three inches in diameter and seven inches long, the electrodes of aluminum and about ⅜ of an inch wide, ⅛ of an inch thick, and 5 inches long, mounted parallel to the longitudinal axis of the bulb, as shown in Fig. 1, with the distance between the diametrically opposite electrodes about one and three-fourths inches and the space or gap between the edges of the electrodes about three-fourths of an inch. The atmosphere is a mixture of neon and helium, containing about 20% by volume of helium, and having in the finished lamp a pressure of about one millimeter of mercury. With such a lamp the series resistance 9 may well be about 300 ohms, and with a resistance of this value the lamp will take from .07 to .1 amperes when connected to a 220 volt circuit.

In a lamp constructed in accordance with my invention the application of an alternating potential to the lamp will cause a glow discharge to appear in the form of a velvety glow or corona of yellowish light over the entire surfaces of all the electrodes and also a suffused glow throughout the entire interior of the bulb. If the applied potential is unidirectional then the electrodes which are positive remain dark. The amount of current and the volume of light is dependent upon the area of the electrodes, the distance they are separated, and the pressure of the gas.

The ease of starting of this lamp and its successful operation on low voltage circuits, such as the commercial lighting circuits commonly used, appear to be due to the fact that the volts per centimeter of the negative glow are very much less than the volts per centimeter required to establish and maintain the positive column which has heretofore been the sole part of the column used for the production of light. If, for example, in a gaseous conduction tube, the positive column fills about ¾ of the length of the tube about 20 volts per centimeter is absorbed in the positive column and only about 5 volts per centimeter in the negative glow, but if the pressure is adjusted so that the negative glow fills about three-fourths of the length of the tube then the volts per centimeter in the negative glow are about one and one-half. The current is small in the first dark space near the cathode, rises to a maximum value in the negative glow, and sinks again very low in the second dark space between the negative glow and the positive column.

The electrodes can be sub-divided if desired, and in the form of lamp shown in Figs. 3 and 4 instead of the bar electrodes shown in Fig. 1 I use filaments or wires which may be arranged in various ways. For example, I may place the filaments 10 and 11 on the arms 8 to form in effect two concentric layers insulated from each other and connected to the two terminals of the lamp.

The filaments or wires may be made of metal, or of carbon, a sufficient number of filaments being used to obtain the desired area of electrode. The discharge is facilitated if the surface of the electrodes is somewhat roughened.

Where the lamp is to be used on direct current a positive electrode may be surrounded by the negative electrodes without loss of light, as the positive electrode remains dark during the operation of the lamp. An example of this arrangement is shown in Figs. 5 and 6 in which the positive electrode 12 is placed close to the central hub, being made in this particular instance in the form of a helix while the negative electrodes on the ends of the arms 8 form a sort of cage surrounding the positive electrode. When this type of lamp is in operation all of the negative electrodes are surrounded by a glow and owing to their distribution in the lamp a very large light giving surface is obtained.

The distribution of light can be modified by varying the shape and position of the electrodes and a desirable form is illustrated in Fig. 7 in which the electrodes are in the form of two parallel plates or disks 13 and 14. If the lamp is connected to a source of alternating current both disks or plates will be surrounded by a glow and the space between them will be filled with diffused glow. If the lamp is to be used on direct current circuits the upper positive electrode may be made considerably smaller as it remains dark during the operation of the lamp and in this case the glow around the negative electrode is depended upon to furnish all of the light.

What I claim as new and desire to secure by Letters Patent of the United States, is:

1. The combination of a closed vessel containing a rarefied atmosphere of rare gas of good conductivity, two electrodes mounted in said vessel and spaced apart a distance such that a glow discharge occurs in response to a low potential difference between said electrodes, said atmosphere being at a pressure such that the luminous discharge from said electrodes is substantially all of negative glow.

2. The combination of a closed vessel containing a rarefied atmosphere which consists principally of neon and the remainder of helium, solid metal electrodes fixed in said vessel and spaced apart a distance less than two inches, said atmosphere being at a pressure such that a potential of 220 volts will establish and maintain from said electrodes a luminous discharge consisting solely of the negative glow.

3. A gaseous conduction lamp comprising a sealed vessel, elongated metal electrodes mounted in said vessel side by side to form discharge gaps having a length greater than the distance between the opposed portion of said electrodes and an atmosphere of rare gases of good conductivity in said vessel at a pressure such that the luminous discharge from the electrodes consists solely of the negative glow.

4. A gaseous conduction lamp comprising a sealed bulb, elongated electrodes mounted concentrically about the longitudinal axis of said bulb and connected so that the adjacent electrodes are alternately of opposite polarity and an atmosphere of rare gas of good conductivity in said bulb at a pressure such that the luminous discharge from said electrodes consists solely of the negative glow.

5. A gaseous conduction lamp comprising a sealed bulb, a positive electrode near the axis of the bulb and a negative electrode concentric with said positive electrode and comprising a plurality of metallic members mounted longitudinally of the bulb and substantially concentric with said positive electrode, said members being metallically connected to the negative terminal of the lamp.

6. A gaseous conduction lamp comprising a sealed bulb, a central glass hub in said bulb provided with radial arms, elongated electrodes mounted on said arms, the distance between said electrodes being less than two inches and a rarefied atmosphere of rare gas in said bulb at a pressure such that the discharge from the electrodes consists solely of the negative glow.

In witness whereof, I have hereunto set my hand this 26th day of November, 1917.

DANIEL McFARLAN MOORE.